(12) United States Patent
Carnahan et al.

(10) Patent No.: US 7,497,643 B2
(45) Date of Patent: Mar. 3, 2009

(54) ARTIFICIAL REEF

(76) Inventors: Richard P. Carnahan, P.O. Box 124, Virginia Beach, VA (US) 23458; Troy W. Kight, P.O. Box 124, Virginia Beach, VA (US) 23458; Garrett Johnson, P.O. Box 124, Virginia Beach, VA (US) 23458

( * ) Notice: Subject to any disclaimer, the term of this patent is extended or adjusted under 35 U.S.C. 154(b) by 0 days.

(21) Appl. No.: 11/582,774

(22) Filed: Oct. 18, 2006

(65) Prior Publication Data
US 2007/0036612 A1    Feb. 15, 2007

Related U.S. Application Data

(63) Continuation of application No. 11/582,774, filed on Oct. 18, 2006, now abandoned, which is a continuation of application No. 10/307,878, filed on Dec. 2, 2002, now abandoned, which is a continuation of application No. 09/818,065, filed on Mar. 26, 2001, now abandoned, which is a continuation of application No. 09/347,890, filed on Jul. 6, 1999, now abandoned.

(51) Int. Cl.
E02B 3/04 (2006.01)
(52) U.S. Cl. .......................... 405/25; 405/19
(58) Field of Classification Search .................. 405/19, 405/25, 29, 32
See application file for complete search history.

(56) References Cited

U.S. PATENT DOCUMENTS

| | | | | |
|---|---|---|---|---|
| 3,834,167 A | * | 9/1974 | Tabor | 405/115 |
| 4,362,433 A | * | 12/1982 | Wagner et al. | 405/107 |
| 4,690,585 A | * | 9/1987 | Holmberg | 405/19 |
| 4,712,944 A | * | 12/1987 | Rose | 405/26 |
| 4,958,956 A | * | 9/1990 | Tanaka et al. | 405/23 |
| 4,981,392 A | * | 1/1991 | Taylor | 405/115 |
| 5,207,531 A | | 5/1993 | Ross | |
| 5,370,476 A | * | 12/1994 | Streichenberger | 405/25 |
| 5,522,674 A | * | 6/1996 | Cooper | 405/63 |
| 5,645,373 A | * | 7/1997 | Jenkins | 405/91 |
| 5,688,075 A | * | 11/1997 | Gradek | 405/63 |
| 5,833,393 A | | 11/1998 | Carnahan et al. | |
| 6,164,870 A | * | 12/2000 | Baruh | 405/114 |
| 6,186,701 B1 | * | 2/2001 | Kempers | 405/19 |
| 6,565,283 B1 | * | 5/2003 | Hall | 405/21 |
| 6,619,884 B2 | * | 9/2003 | Davis et al. | 405/111 |
| 6,715,958 B2 | * | 4/2004 | Wittenberg et al. | 405/21 |
| 2004/0071510 A1 | * | 4/2004 | Dery | 405/115 |
| 2004/0101368 A1 | * | 5/2004 | Daigle | 405/19 |

* cited by examiner

*Primary Examiner*—Tara L. Mayo
(74) *Attorney, Agent, or Firm*—Williams Mullen; M. Bruce Harper

(57) ABSTRACT

An artificial reef comprises at least one bag which is generally configured to define at least a portion of a reef and which is at least partially fillable with air. An anchor is attached to the bag for maintaining the bag at a desired location substantially underwater. A plurality of such bags may be attached to one another and configured so as to define a reef which enhances the suitability of waves for surfing or which mitigates beach erosion.

21 Claims, 10 Drawing Sheets

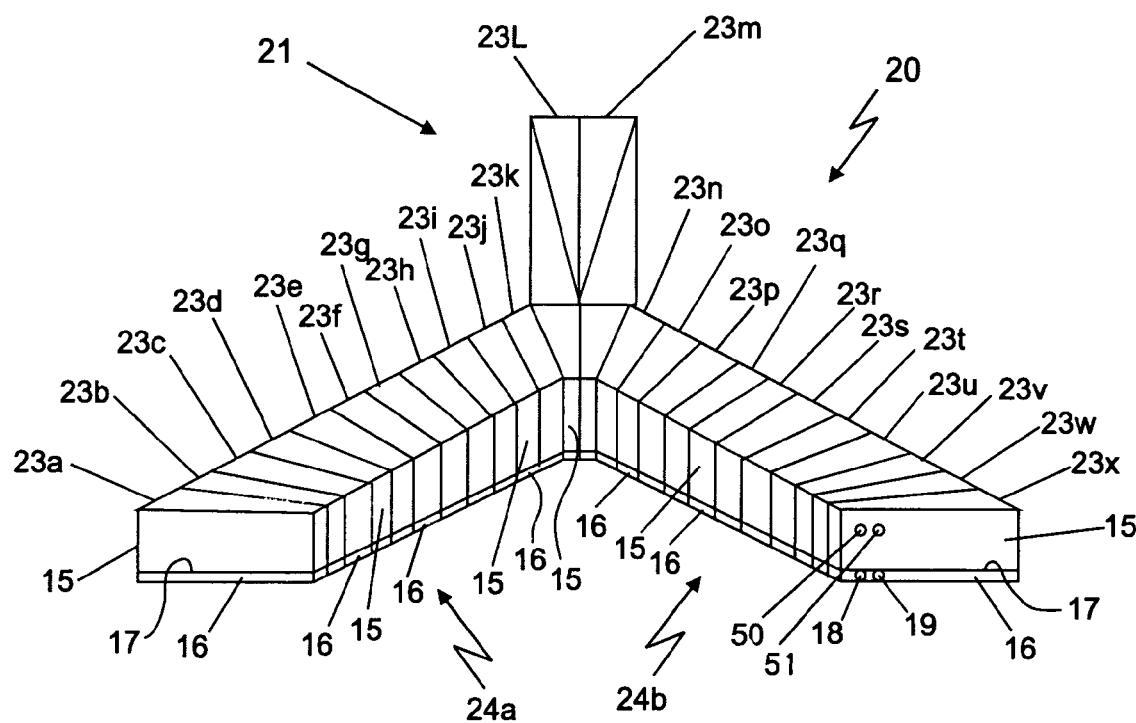
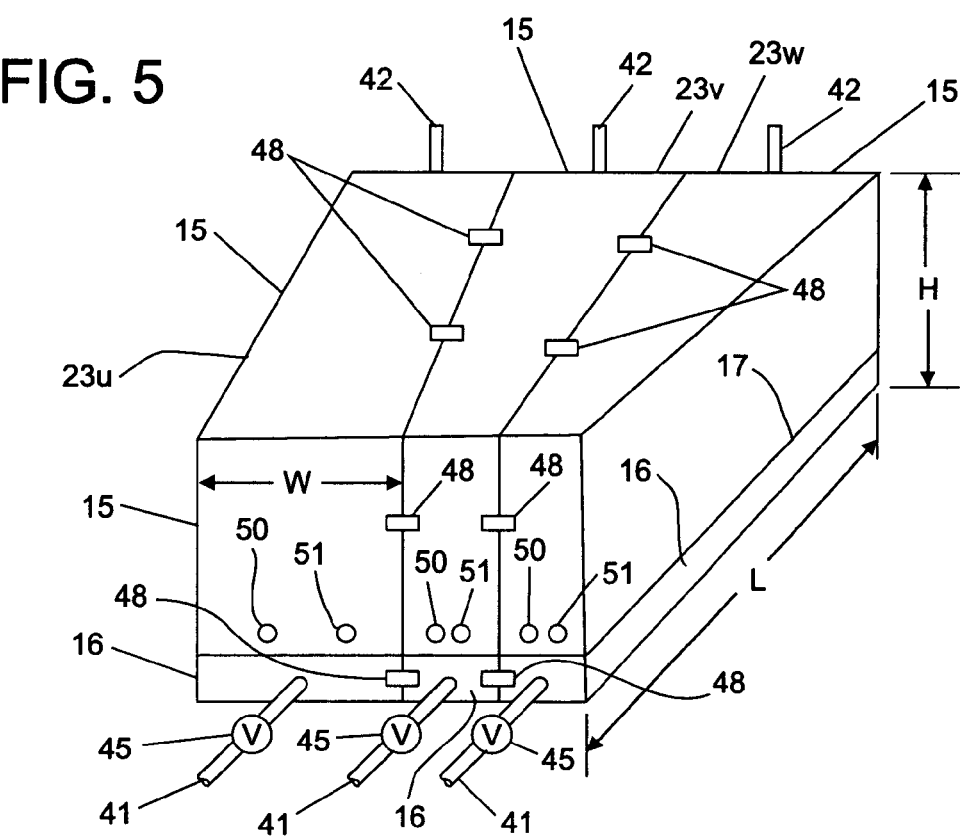

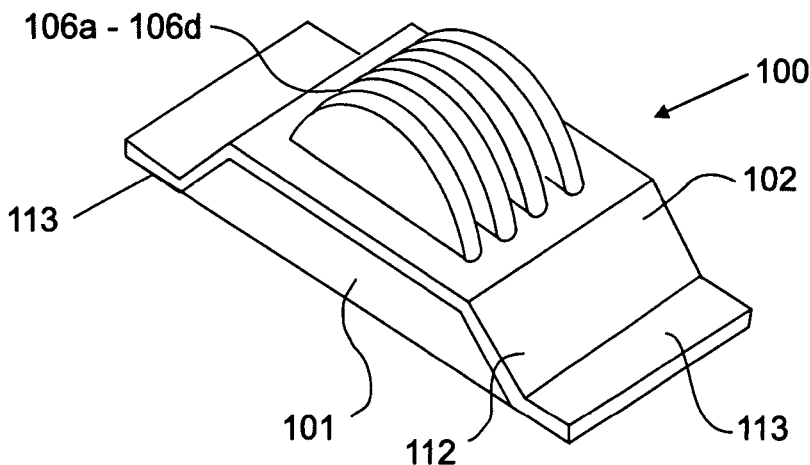
FIG. 11
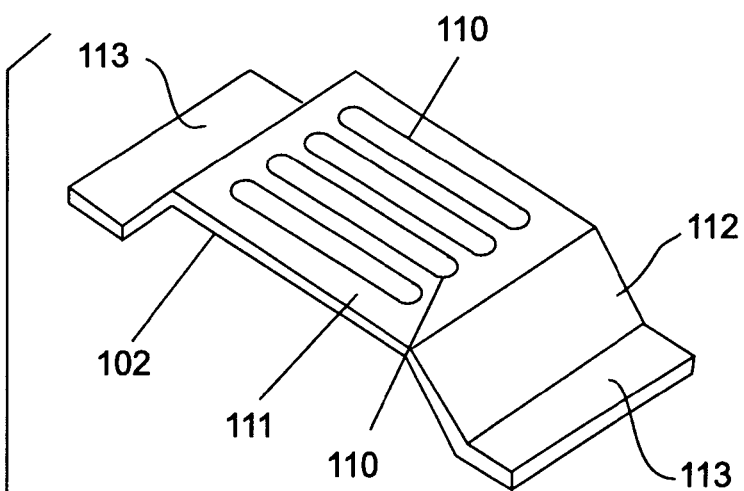
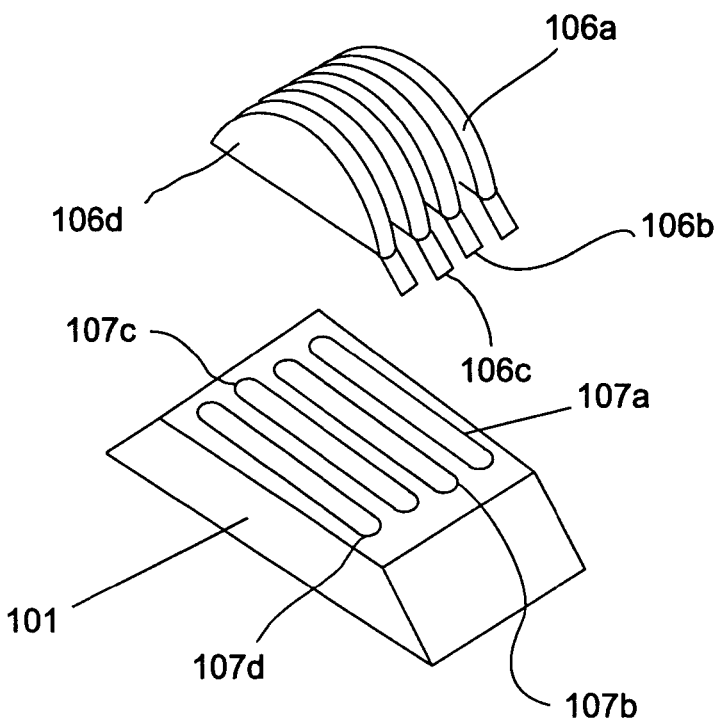
FIG. 12

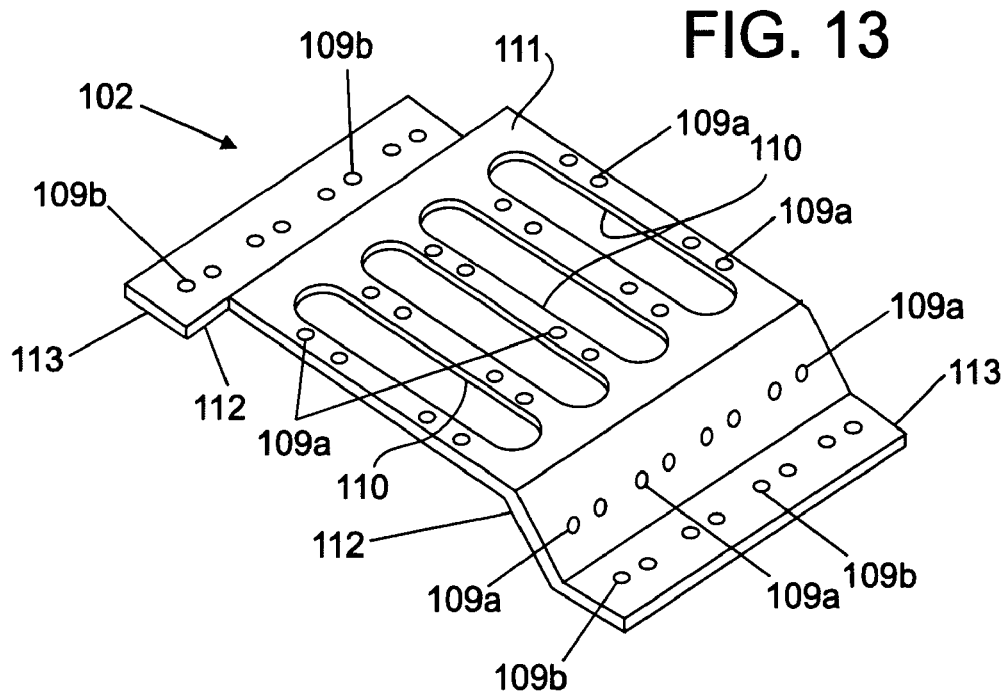
FIG. 13
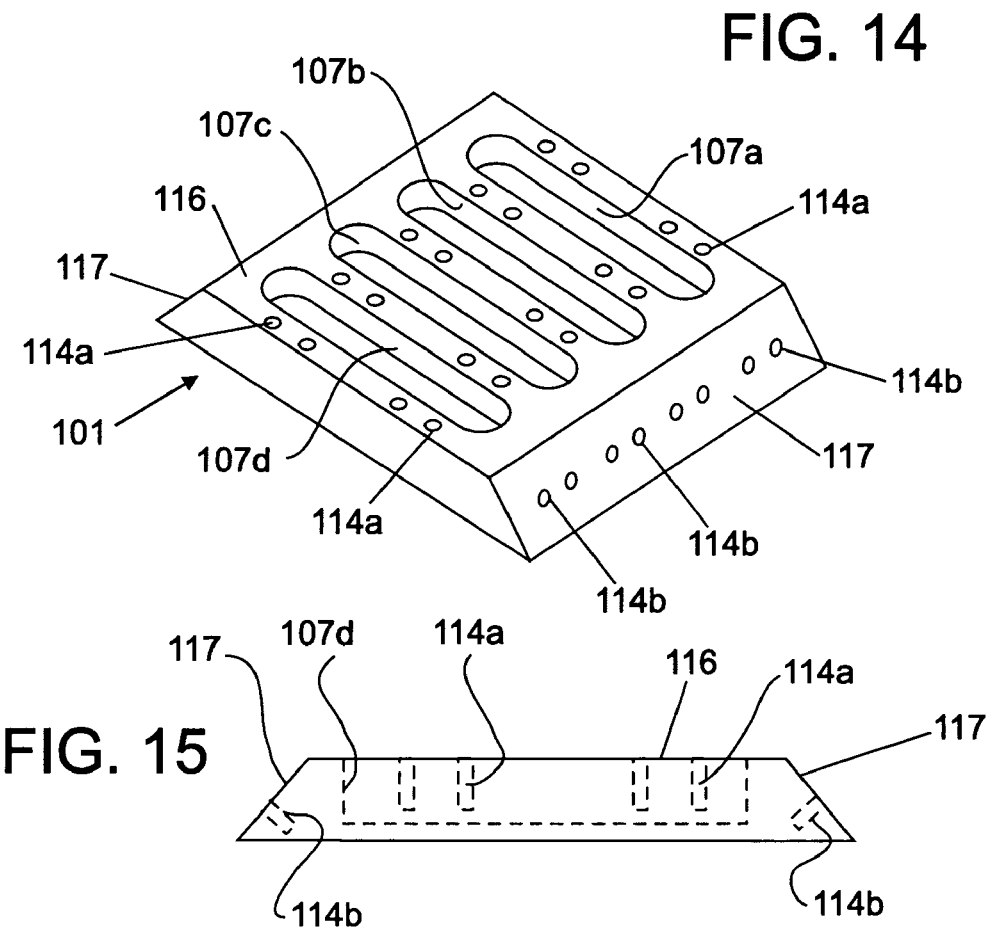
FIG. 14
FIG. 15

ARTIFICIAL REEF

This application is a continuation of pending U.S. patent application Ser. No. 11/582,774 filed on Oct. 18, 2006, entitled "Artificial Reef", now abandoned, which is a continuation of U.S. patent application Ser. No. 10/307,878, filed on Dec. 2, 2002, entitled "Artificial Reef", now abandoned, which is a continuation U.S. patent application Ser. No. 09/818,065, filed Mar. 26, 2001, entitled "Artificial Reef", now abandoned, which is a continuation of U.S. patent application Ser. No. 09/347,890, filed Jul. 6, 1999, entitled "Artificial Reef", now abandoned.

CROSS REFERENCE TO RELATED APPLICATION

The present application claims priority from U.S. Utility patent application Ser. No. 10/307,878 filed Dec. 2, 2002 which claims the benefit of U.S. Utility patent application Ser. No. 09/818,065 filed Mar. 26, 2001.

BACKGROUND OF THE INVENTION

1. Field of the Invention

The present invention relates generally to offshore construction and relates more particularly to an artificial reef which may be configured so as to facilitate the enhancement of waves such that the waves are better suited for bodysurfing, boardsurfing, sailboarding, jetskiing and other recreational activities, and which may also be configured to reduce wave height so as to mitigate beach erosion and/or provide comparatively still waters where desired.

2. Description of the Related Art

It is well-known that natural reefs tend to enhance waves so as to make them more suitable for recreational activities such as bodysurfing, boardsurfing, sailboarding, jetskiing and the like. Such natural reefs cause waves to break in a manner which is desirable for such activities. Such breaking occurs as the water depth is decreased by the reef, according to well-known principles.

At least one artificial reef for enhancing waves so as to make them more suitable for surfing is known. U.S. Pat. No. 5,207,531, issued to Ross on May 4, 1993 discloses an artificial surfing reef for modifying an ocean floor near the shore so as to create surfing waves.

Although the Ross artificial surfing reef may be effective in enhancing waves so as to make them more suitable for surfing, it is important to note that the Ross artificial surfing reef suffers from inherent disadvantages which detract from its overall effectiveness and desirability. For example, the Ross artificial surfing reef is comprised of a plurality of polyvinyl chloride (PVC) pipes configured in a V-shape or Y-shape. Although the use of PVC pipes does facilitate the construction of an artificial reef which is substantially lighter than a similar reef comprised of concrete or rock, an artificial reef constructed of PVC pipe is still undesirably heavy, bulky and difficult to transport both upon the land and while in the water.

Artificial reefs comprised of materials such as concrete, stone or PVC present a substantial safety hazard to surfers who are subject to being tossed forcefully upon such structures. This may occur, for example, when a surfer wipes out.

The construction of jetties and artificial reefs to reduce the size and power of waves in an attempt to mitigate beach erosion and/or help provide comparatively still waters is also well-known. Jetties are partitions which extend generally perpendicularly from a beach, so as to break up waves which are incident upon the beach at a non-perpendicular angle with respect to the beach. Jetties thus prevent waves which travel diagonally with respect to the beach from having a substantial undesirable erosive impact upon the beach. Such jetties are commonly formed of wood, concrete or rock.

Artificial reefs reduce the power and size of waves by interfering with the underwater portions of the waves so as to dissipate the energy thereof. In this manner, the ability of the wave to erode a beach or to cause the water between the artificial reef and the shore to be undesirably rough is mitigated.

Although such jetties and artificial reefs have proven generally effective in mitigating beach erosion and/or in helping to provide comparatively still waters, such contemporary jetties and artificial reefs do possess characteristics which reduce the overall desirability thereof. For example, contemporary jetties and artificial reefs tend to be constructed as permanent or semi-permanent structures which cannot easily be dismantled and/or moved about as desired.

In view of the foregoing, it is desirable to provide an artificial reef which is light in weight, collapsible so as to reduce the bulk thereof and thereby facilitate convenient storage and transport of the artificial reef, and which is substantially resilient so as to provide an artificial reef which is comparatively safe for use in surfing and other recreational activities.

SUMMARY OF THE DISCLOSURE

The present invention specifically addresses and alleviates the above-mentioned deficiencies associated with the prior art. More particularly, the present invention comprises an artificial reef comprising at least one bag which is generally configured to define at least a portion of the artificial reef and which is at least partially fillable with air. As used herein, the term "reef" is defined to include a structure which is disposed substantially underwater and which is capable of substantially modifying waves.

Thus, according to the present invention, the artificial reef is defined by filling one or more bags at least partially with air. The use of air filled bags has substantial advantages over prior art rigid structures. The use of air for filling the bags is convenient in that air is readily available and easily pumped. Further, air can be provided from compressed air bottles, thereby eliminating any need to use a pump.

As used herein, air is defined to include ambient air (which is comprised primarily of nitrogen, oxygen, and carbon dioxide) as well as nitrogen, carbon dioxide, and other gaseous elements, compounds or mixtures. Generally, it is expected that ambient air will be utilized because of its availability and low cost.

An advantage of the use of air in filling the artificial reef of the present invention is that a comparatively soft and resilient surface is provided. As those skilled in the art will appreciate, such a soft surface is particularly desirable when the artificial reef of the present invention is used in recreational applications, wherein people are likely to inadvertently strike the artificial reef. For example, when used in a wave pool, surfers may wipeout and be thrown forcefully against the artificial reef. Of course, the softer and more flexible the artificial reef, the less likely that such a person is to sustain an injury when inadvertently contacting the artificial reef.

As used herein, the term "surfing" is defined to include bodysurfing, boardsurfing, sailboarding and any other recreational activities which require similar waves.

Further, the use of air to fill the artificial reef of the present invention provides an artificial reef which may be more easily moved about in the water, since the use of air, in combination with a ballast, facilitates enhanced control of the weight or buoyancy of the artificial reef. Thus, air may be added to or vented from the artificial reef of the present invention as necessary so as to provide approximately neutral or slightly positive buoyancy therefor, such that the artificial reef may be moved about within the water with comparative ease, so as to facilitate desired positioning thereof.

As used herein, the term "bag" is defined to include any flexible container suitable for substantially containing air underwater. Thus, such bags include enclosures comprised of polymer sheet material, including such materials as vinyl, polyethylene, polycarbonate, polyurethane, etc. Alternatively, the bags of the artificial reef of the present invention may comprise rubberized cloth or rubberized canvas.

The bags preferably have a thickness of between approximately 0.010 inch and approximately 0.100 inch, preferably approximately 0.040 inch.

An anchor is used to maintain the bag(s) at a desired location, such as at a beach or within a wave pool, a lake, or within any other desired body of water. As used herein, the term "anchor" is defined to include any device used to attempt to maintain the artificial reef at a desired location within a body of water. Thus, the anchor may comprise weights which are attached to or contained within the artificial reef. Such weights may include concrete, rock, sand, soil, water, or any other material which is heavier than air, and which are also preferably heavier than water. Optionally, one or more tethers may be utilized to attach the bag to such weights.

When the artificial reef of the present invention is disposed within an artificial or man-made body of water, such a wave pool, then eye bolts or other fasteners which are attached to the bottom of the man-made structure may be utilized to attach the tether(s) thereto. Alternatively, the bags may be attached directly to such eye bolts or other fasteners, e.g., without the use of tethers.

Optionally, a plurality or rigid supports are attached to the artificial reef, preferably to each individual bag thereof, so as to maintain the artificial reef at a desired distance above a floor of the body of water. A plurality of tethers may be utilized along with the rigid supports to hold the bags down.

According to the preferred embodiment of the present invention, a plurality of bags are attached to one another so as to define a reef. Alternatively, the artificial reef may be defined by a single bag. Modular construction of the artificial reef facilitates the definition of a variety of different configurations of artificial reefs which may be utilized for a corresponding variety of different applications. For example, V or Y-shaped reefs are generally preferred for providing waves suitable for surfing upon. Various other configurations of artificial reefs may be desirable for mitigating beach erosion.

The use of a plurality of bags to define an artificial reef according to the present invention allows the individual bags to be more easily transported and positioned within the body of water as desired. As those skilled in the art will appreciate, the transportation and positioning of individual bags is much simpler than the transporting and positioning of an entire, preassembled artificial reef. Thus, the individual bags may be attached to one another at the desired location within a body of water so as to define an artificial reef having the desired configuration.

Further, the use of a plurality of individual bags enhances the reliability of the artificial reef, since damage to an individual bag, resulting in undesirable deflation thereof, affects only the damaged bag. Thus, damage to an individual bag does not typically result in failure of the entire artificial reef of the present invention. That is, a leak in a single bag will not typically result in deflation of the entire artificial reef.

By configuring the individual bag so as to define an artificial reef having a generally V-shaped configuration or a generally Y-shaped configuration, waves may be enhanced so as to be more suitable for surfing. Thus, waves which extend generally parallel to the beach or which extend diagonally with respect thereto may be caused to break in a manner wherein the break generally follows a path which is substantially parallel to the beach, so as to provide for surfing along a desirably increased distance.

According to the preferred embodiment of the present invention, at least one of the bags comprises both an air compartment, which is specifically configured for containing air, and a ballast compartment, which is specifically configured for containing ballast. The ballast may comprise various materials which are heavier than air, and which preferably are also heavier than water. Thus, the ballast compartment may be configured so as to contain water, sand, soil, rock, and/or any other desired material. Preferably, the air compartment is substantially larger than the ballast compartment.

Alternatively, the air compartment may be substantially smaller than the ballast compartment, particularly when the ballast compartment is configured to contain water. In this manner, an artificial reef may be formed such that it is comprised of a bag which is mostly filled with water and which has a comparatively small volume (as compared to the volume of the water) of air disposed atop the volume of water, so as to provide a soft surface which reduces the likelihood of injury when inadvertently contacted during recreational activities. Preferably, the comparatively small volume of air is provided by making the air compartment comparatively small with respect to the ballast compartment, such that the air compartment defines a thin, e.g., approximately 2 inches to 12 inches, layer disposed atop the ballast compartment, which may be filled with water, as well as other, generally heavier, materials.

According to an alternative configuration of the present invention, a bag containing a substantial quantity of water and only having a comparatively smaller quantity of air contained therein may be utilized. Such a bag containing both air and water may comprise a separate ballast compartment for containing heavier than water ballast such as sand, soil, rock, etc. Thus, according to this alternative configuration of the present invention, the bag comprises two compartments. The uppermost compartment is an air/water compartment which contains both water and a thin layer of air. The bottom compartment comprises a ballast compartment which contains heavier material, so as to prevent undesirable movement of the artificial reef.

As a further alternative, the bag may comprise three separate compartments. The uppermost compartment is configured to contain air so as to provide a cushioned surface. A middle compartment is configured to contain water. A bottom compartment is configured to contain other ballast, which is preferably heavier than water, such as sand, soil, rock, or any other desired heavier than water material.

According to the two compartment embodiment of the present invention, a common wall preferably separates the air compartment from the ballast compartment.

At least one of the bags comprises an air compartment having an air inlet/outlet port for facilitating inflation and deflation of the bag. Optionally, separate air inlet and air outlet ports may be provided for each bag.

According to one preferred embodiment of the present invention, either a common single air inlet/outlet port or a single pair of air inlet and air outlet ports is utilized to effect inflation and deflation of either the entire artificial reef or of a section (comprised of a plurality of individual bags) thereof.

Thus, a plurality of individual bags are attached to one another in a manner which facilitates the communication of air therebetween, such that when a selected one of the bags is inflated or deflated, the attached bags (which are in air communication with one another) similarly inflate or deflate.

In a similar manner, a plurality of bags may be in water communication with one another, such that when the ballast compartment of a selected one of the bags is filled or unfilled with water, then the remaining bags tend to be simultaneously filled or unfilled along therewith.

Such air communication and/or water communication among a plurality of bags may be effected via a variety of fluid communication fittings, according to well-known principles. Thus, according to one preferred embodiment of the present invention, attachment of the individual air bags to one another includes connection of air and/or water communication fittings to one another, so as to facilitate the simultaneous addition and/or removal of air and/or water thereto and therefrom.

Optionally, quick disconnects may be used to facilitate such communication of air and/or water between bags. As used herein, quick disconnects are defined to include any fluid, e.g., air or water, couplings which facilitate the making and breaking of a fluid connection between adjacent bags in an easy and convenient manner.

According to the preferred embodiment of the present invention, the air inlet port and the air outlet port of the bag(s) are remotely controlled such that the artificial reef may be inflated or deflated as desired. Preferably, each individual bag has separate, remotely controllable air inlet and air outlet ports to facilitate inflation of each individual bag to a desired degree. Similarly, each individual bag preferably comprises a remotely controllable water inlet port and a remotely controllable water outlet port, so as to facilitate the addition and removal of ballast thereto, as desired. The closable opening is preferably configured so as to facilitate the insertion and removal of ballast such as rocks, gravel and soil to and from the ballast compartment. The closable opening preferably comprises a zipper or other mechanism which effects closing thereof. According to one preferred embodiment of the present invention, the closable opening comprises either an openable slit or an openable flap formed in the ballast compartment.

Optionally, each ballast compartment comprises a closable opening for facilitating addition of ballast to the ballast compartment and removal of ballast therefrom, as desired.

Preferably, inflation and/or deflation of the bags with air is individually controllable, so as to facilitate configuring of the artificial reef in a desired manner, thereby permitting modification of the artificial reef in a manner which facilitates enhanced control of the reefs ability to modify waves. By facilitating individual control over the inflation of each bag, enhanced control over how fast a wave peels and enhanced control of the hardness of the face of the resulting wave is facilitated. By providing such individual control over the inflation of the bags, the depth of the reef is better controlled, so as to provide enhanced control over the size of a wave which pitches over when the wave encounters the artificial reef.

Preferably, each individual bag of the artificial reef is configured so as to facilitate attachment to another bag of the artificial reef. Thus, ties, clips, buckles, hook and loop fasteners, etc. may be utilized to effect the attachment of each bag to an adjacent bag.

Optionally, each of the bags are configured so that they may be tied to one another. Thus, eyelets, D-rings, or the like may be utilized to facilitate such attachment.

According to one preferred embodiment of the present invention, the artificial reef comprises at least one bag defined by a pouch formed in a liner, wherein the liner is used to mitigate water leakage from a body of water. That is, a liner which is disposed beneath a body of water so as to mitigate leakage of water into the ground below the body of water has a pocket formed therein and the pocket can be inflated with air and/or water so as to define an artificial reef. Such a pocket may be formed in the liner prior to deployment of the liner in the body of water. Alternatively, the pocket may be added to the liner after the liner has been installed. In either instance, the pocket may be formed by attaching sheet material to the liner via a variety of methods such as ties, sewing, hook and loop fasteners, snaps, buckles, adhesive bonding, thermal welding, ultrasonic welding, etc.

Alternatively, one or more pockets may be formed in such a liner for receiving and holding the artificial reef. Such pocket(s) may be formed in the liner so as to receive the individual bags of an artificial reef or so as to receive the entire artificial reef. Thus, either a single pocket may be formed which receives the entire artificial reef, or a plurality of separate pockets may be formed and each pocket is configured so as to receive a single bag or a group of bags which, when taken together, define the artificial reef.

When the artificial reef is at least partially defined by a portion of such a liner or is held in place by such a liner, then the liner itself is preferably held in place via anchoring which may comprise any desired structures or fasteners which hold the liner to the structure (which may be either natural or manmade) over which the liner is disposed. Alternatively, such anchoring may comprise weights which are placed upon the liner, such as adjacent the artificial reef and/or within the artificial reef. For example, gravel, stone or concrete may be placed around and/or within the artificial reef, so as to maintain the artificial reef at a desired position within a body of water.

According to one preferred embodiment of the present invention, an air compressor is used to facilitate inflation of the artificial reef with air. Alternatively, compressed air, such as that stored within bottles, may similarly be utilized.

Optionally, a vacuum pump is in fluid communication with the air compartment of the bag(s) of the artificial reef, so as to facilitate controlled deflation thereof. A control panel facilitates control of the air compressor and/or vacuum pump.

According to one preferred embodiment of the present invention, the control panel facilitates the control of valves which control the addition of air and/or water to the artificial reef, so as to facilitate control over the inflation and/or buoyancy thereof.

Optionally, pressurized air removed from the artificial reef of the present invention may be stored within an air reclamation tank, such that less energy is required to facilitate compression thereof for subsequent use within the artificial reef than is required to effect similar compression of ambient air.

According to another preferred embodiment of the present invention, an artificial reef assembly is formed so as to comprise a base which preferably comprises concrete or the like, a retainer bracket which preferably comprises stainless steel and a plurality of bags having flanges which are captured intermediate the retainer bracket and the base.

Optionally, the bags of the artificial reef assembly of any embodiment of the present invention comprise a durable outer liner, an airtight inner liner and a resilient foam material disposed intermediate the outer liner and the inner liner.

The durable outer liner provides abrasion and puncture resistance, so as to mitigate the likelihood of undesirable deflation of a bag.

The resilient foam material provides a softer or more cushioned surface, so as to mitigate the likelihood of an injury resulting from inadvertent contact with the bag, such as may occur during recreational activities.

The airtight inner liner provides a seal adequate for mitigating air leakage from the bag.

Thus, according to the present invention, an artificial reef is provided for facilitating the enhancement of waves such that the waves are better-suited for bodysurfing, boardsurfing, sailboarding, jetskiing and other recreational activities and/or for mitigating beach erosion as well as for providing comparatively still waters (such as is desired in defining a harbor or marina) where desired.

Further, the present invention may optionally be used to define jetties which may be used to channel or disburse waves, so as to mitigate beach erosion and/or so as to cause the waves to deposit or remove sand from selected areas of the beach. Thus, the present invention may be used to define jetties which redirect the power of waves so as to cause the waves to redistribute sand in a desired manner.

DESCRIPTION OF THE DRAWINGS

These, and other features, aspects and advantages of the present invention will be more fully understood when considered with respect to the following detailed description, appended claims and accompanying drawings wherein:

FIG. 3 is a perspective view of a Y-shaped artificial reef according to the present invention;

FIG. 5 is a perspective view of three bags attached to one another according to the present invention;

FIG. 11 is a perspective view of an artificial reef assembly according to the present invention;

FIG. 12 is an exploded view of the artificial reef assembly of FIG. 11, better showing the base, four separate air bags and retaining bracket thereof;

FIG. 13 is an enlarged perspective view of the retaining bracket of FIG. 12;

FIG. 14 is an enlarged perspective view of the base of FIG. 12;

FIG. 15 is a side view of the base of FIG. 14;

DETAILED DESCRIPTION OF THE PREFERRED EMBODIMENT

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The artificial reef of the present invention is illustrated in FIGS. 1-20 which depict presently preferred embodiments thereof.

Figure 1:
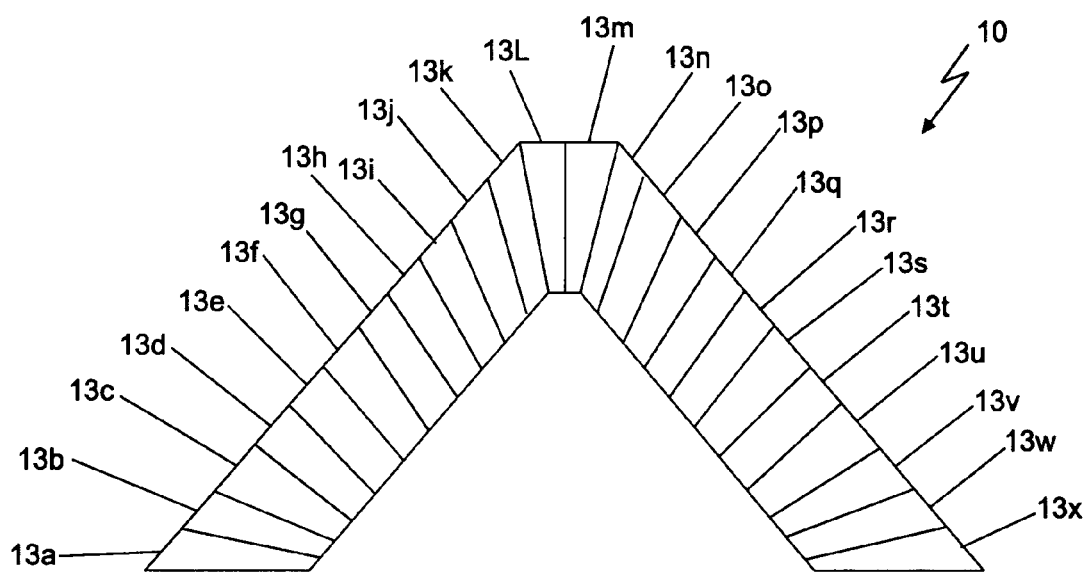
FIG. 1 is a top view of a V-shaped artificial reef comprising a plurality of individual bags which are at least partially filled with air according to the present invention.
Figure 2:
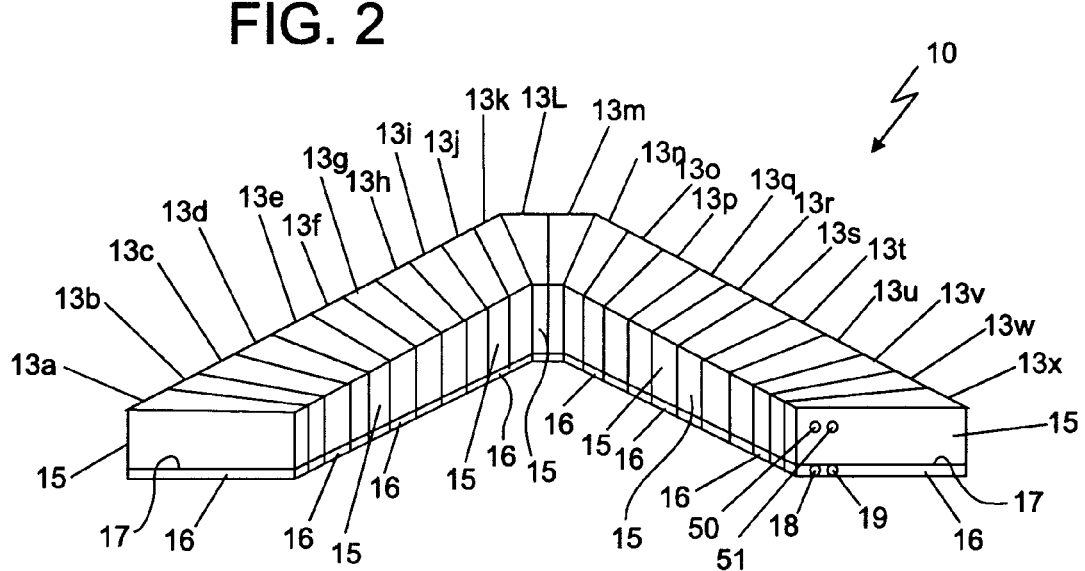
FIG. 2 is a perspective view of the V-shaped artificial reef of FIG. 1.

Referring now to FIGS. 1 and 2, the artificial reef 10 of the present invention may optionally be configured to have a generally V-shape, so as to enhance the suitability of waves passing thereover for surfing and other recreational activities. Such a V-configuration of the artificial reef may also be useful in mitigating beach erosion and/or other applications. As those skilled in the art will appreciate, by orienting the artificial reef of FIG. 1 in the water at a beach such that the apex of the artificial reef points away from the beach and the two legs thereof extend generally toward the beach, waves can be caused to break in a manner which enhances their suitability for surfing.

When waves encounter the reduced water depth defined by the artificial reef 10, then those waves tend to break or topple over. Because of its V-shape, the artificial reef 10 causes waves to break in two different directions and in a manner wherein the break tends to run generally parallel to the beach. Thus, for waves which are generally parallel or diagonal to the beach, the artificial reef 10 causes a break to form proximate the apex thereof and then to move generally parallel to the beach in a manner which enhances the wave's suitability for surfing by increasing the amount of time that the wave may be ridden. Also, the time at which the wave peels and the degree of peeling may be substantially controlled by the depth and placement of the artificial reef 10. In this manner, the face of the wave may be modified in a manner which enhances the wave suitability for surfing.

Thus, the V-shaped artificial reef (as well as the Y-shaped artificial reef of FIG. 3) tends to form two separately breaking waves, each wave traveling in an opposite direction along the beach. These two waves may each be utilized for recreational activities such as bodysurfing, boardsurfing, sailboarding and jetskiing.

As shown in FIG. 1, the artificial reef 10 comprises a plurality of separate chambers or sections 13a-13x which are attached to one another in the desired, e.g., V-shaped, configuration.

The bags 13a-13x may be removably attached to one another by any desired means, such as by tying, hook and loop fasteners, buckles, clips, or any other desired type of fasteners. Such fasteners are depicted generically as 48 of FIG. 5.

Alternatively, the bags 13a-13x may be permanently attached to one another via such methods as sewing, thermal welding, ultrasonic welding and/or adhesive bonding.

With particular reference to FIG. 2, each bag 13a-13x preferably comprises an air compartment 15 and a water or ballast compartment 16, which are preferably separated from one another via a common wall 17.

Bags having different shapes are preferably utilized so as to more readily facilitate the construction of an artificial reef 10 having a desired overall shape and configuration. More particularly, bags 13a, 13b, 13c, 13L, 13m, 13v, 13w and 13x are preferably somewhat wedge-shaped whereas bags 13d-13k and 13n-13u are preferably somewhat more rectangular in shape. Thus, it will be appreciated that various different shapes of bags may be utilized so as to facilitate the construction of artificial reefs having various desired shapes, e.g., square, rectangular, hexagonal, etc., and configurations. Alternatively, only bags having identical shapes may be utilized, if desired.

A water inlet port 18 and a water outlet port 19 facilitate filling of the ballast compartments 16 of each bag 13a-13x with water or any other desired fluid, so as to increase the weight of the artificial reef 10 and thereby make it less buoyant. Alternatively, a single water inlet/outlet port (rather than a separate port for water inlet and water outlet) may be utilized to both fill the ballast compartments and to remove water therefrom.

Similarly, air inlet port 50 and air outlet port 51 facilitate inflation and deflation of the air compartment 15 of the bags 13a-13x with air. Alternatively, a single air inlet/outlet port (rather than a separate port for air inlet and air outlet) may be utilized to both fill the air compartments 15 with air and to remove air therefrom.

Figure 4:
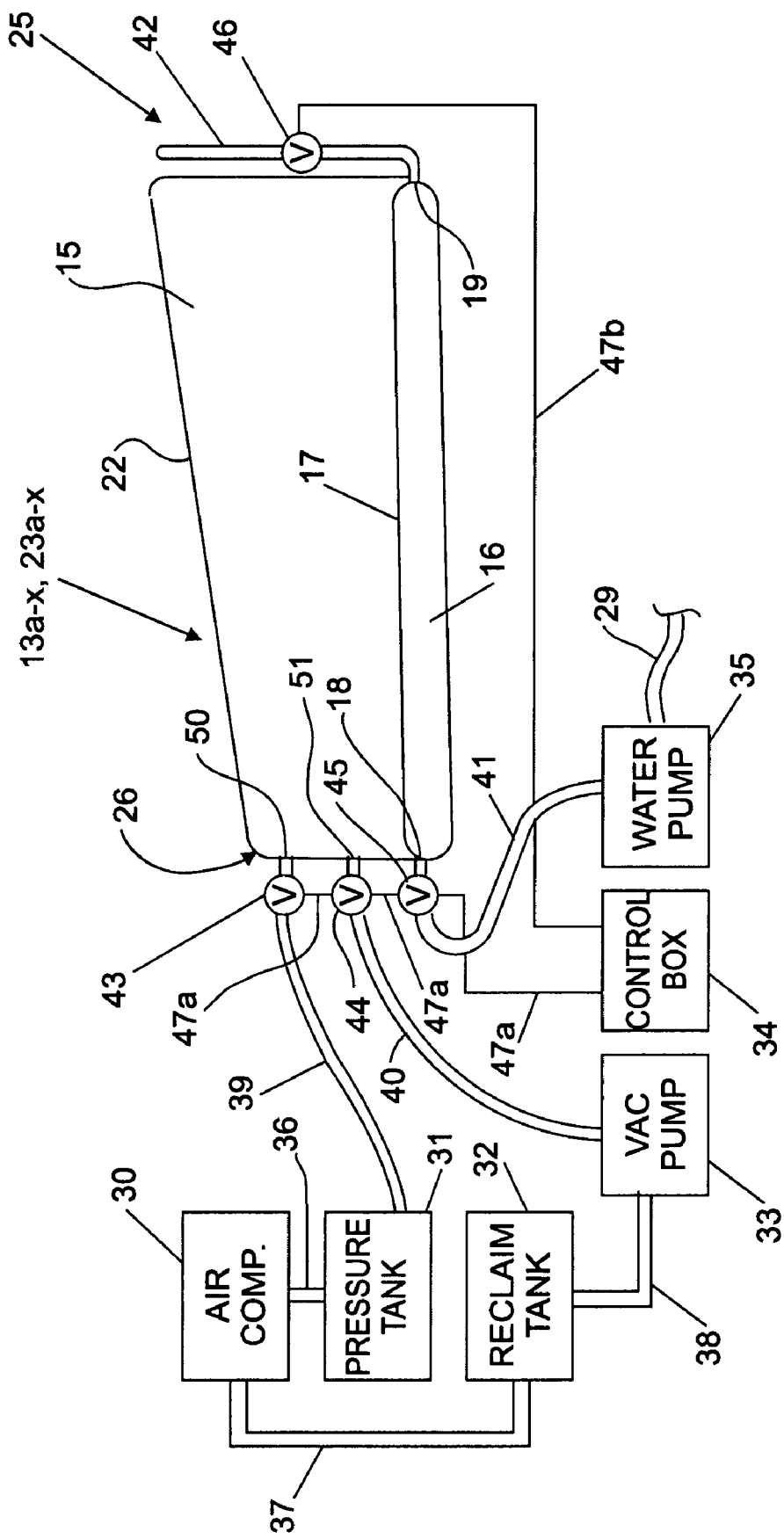
FIG. 4 is a side view of an individual bag having both an air compartment and a water compartment and also showing the attachment of equipment for facilitating the addition and removal of both air and water with respect thereto.

Alternatively, separate water inlet 18 and water outlet 19 ports and/or separate air inlet 50 and air outlet 51 ports may be provided for each individual bag 13a-13x, as shown in FIGS. 4 and 5 and discussed in detail below.

Thus, any desired combination of water inlets and water outlet ports, as well as air inlets and air outlet ports may be utilized. As such, a single water inlet/outlet port or a single pair of water inlet and outlet ports may be utilized to facilitate addition and removal of water to and from any selected bag or plurality of bags and in a similar manner, a single air inlet/outlet port or a single pair of water inlet and outlet ports may be utilized to facilitate the addition and removal of water to and from any selected bag or plurality of bags.

When only a single pair of water inlet 18 and water outlet 19 ports, as well as a single pair of air inlet 50 and air outlet 51 ports is provided for the entire reef 10 or for some section thereof, then at least one of the bags 13a-13x is connected to an adjacent bag 13a-13x in a manner which places adjacent air compartments 15 in fluid communication with each other and which places adjacent ballast compartments 16 in fluid communication with each other. Such interconnection facilitates the simultaneous introduction of air to each air compartment 15 via air inlet port 50 and facilitates the simultaneous removal of air from each air compartment 15 via air outlet port 51 and similarly facilitates the simultaneous addition and removal of fluid from each ballast compartment 16, via the water inlet 18 and water outlet 19 ports.

Referring now to FIG. 3, an alternative configuration 21 of an artificial reef 20 is shown. This alternative configuration 21 of the artificial reef 20 is generally Y-shaped, so as to further enhance the suitability of waves for surfing and other recreational activities. This Y-configuration of the artificial reef may also be useful in mitigating beach erosion and/or other applications.

The alternative configuration of the artificial reef 20 comprises a plurality of bags 23a-23x configured so as to define a generally Y-shaped structure. To define the Y-shaped structure, the centermost two bags 23L and 23m are preferably extended substantially in length. The remaining bags 23a-23k and 23n-23x are substantially similar to bags 13a-13k and 13n-13x of FIG. 1. The center leg of the Y-shaped structure may alternatively be formed by adding additional bags to the V-shaped structure of FIGS. 1 and 2. Indeed, those skilled in the art will appreciate that various other configurations of bags may be utilized so as to define a Y-shaped structure.

Bags 23L and 23m define a leading leg 21 of the artificial reef 20. The leading leg 21 will encounter swells before the remainder of the artificial reef 20, i.e., before the trailing legs 24a and 24b. When a swell contacts the leading leg 21, the leading leg 21 creates resistance along the bottom of the swell, thereby impeding the shoreward motion of the swell. This impeding of the beachward forward motion of the swell causes the wave to slow, thereby further enhancing the effect of the trailing legs 24a and 24b in the modification of the wave. That is, the leading leg 21 slows swells which are moving too fast for the trailing legs 24a and 24b alone to have the desired effect upon the wave. Thus, the Y-shaped artificial reef 20 of the present invention is useful for modifying waves which are traveling too fast for a V-shaped artificial reef, as shown in FIG. 1, to enhance the wave so as to make it more suitable for surfing.

The leading leg 21 further functions as a guide, so as to cause the swell to tend to be incident upon the trailing legs 24a and 24b at a desired angle, i.e., so as to tend to align the wave such that it is generally perpendicular to the leading leg 21. Thus, a Y-shaped artificial reef 20 may be useful when the direction of a wave needs to be modified. The length of the leading leg 21 can be varied so as to better modify the direction of incoming waves. Thus, the leading leg 21 can be lengthened or shortened, so as to provide the desired degree of slowing of incoming waves and can also be lengthened or shortened so as to provide the desired degree of aligning of such incoming swells. Further, the depth below the surface of the leading leg 21 can be selected so as to provide the desired degree of slowing of incoming waves.

In a similar manner, the depth and orientation of the trailing legs 24a and 24b may be varied so as to provide the desired modification to incoming waves.

The artificial reef of the present invention may be utilized in combination with a wave cannon, such as that described in U.S. Pat. No. 5,833,393 issued to Carnahan et al. on Nov. 10, 1998 and entitled WAVE CANNON, the entire contents of which are hereby incorporated by reference. By utilizing the artificial reef of the present invention in combination with such a wave cannon or the like, a wave pool may be created wherein waves suitable for surfing and other recreational activities are provided. Thus, surfing and other recreational activities may be enjoyed at inland locations, which may be remotely located with respect to an ocean.

Referring now to FIGS. 4 and 5, each bag 13a-13x or 23a-23x optionally comprises the valves and ports necessary to effect independent filling thereof with air and/or water. By facilitating the independent filling of each bag with air and/or water, the size and firmness of each bag is independently controlled, so as to facilitate configuration of the artificial reef of the present invention in a desired manner.

It is important to appreciate that different reef depths are required in order to form and/or modify waves of correspondingly different heights. Thus, the ability to vary the height of the artificial reef of the present invention, by varying the quantity of air within each bag 13a-13x or 23a-23x, facilitates adjustment of the artificial reef of the present invention in a manner which desirably accommodates various different wave heights.

As shown in FIG. 4, the height of the bag 13a-13x or 23a-23x is slightly greater at the leading end 25 than at the trailing end 26 thereof. Alternatively, the bag may configured such that the height thereof at the leading end 25 and trailing end 26 are approximately equal or such that the height at the trailing end 26 is greater than the height of the bag at the leading end 25.

With particular reference to FIG. 5, the dimensions of each bag may be varied, as desired. Thus, each bag has a height, dimension H, which facilitates placement of the top thereof at a desired depth, so as to modify waves in a desired fashion. Similarly, each bag has a length, dimension L, which provides the necessary degree of interaction with the wave so as to provide the desired degree of slowing and/or redirection thereof. The width, dimension W, of each bag may vary from one end of the bag to the other end thereof and is determined by the desired shape of the bag, e.g., generally rectangular, wedge-shaped, etc.

With particular reference to FIG. 4, air compressor 30 provides pressurized air via conduit 36 to pressure tank 31. Pressure tank 31 provides pressurized air, via conduit 39, to the air compartment 15 of the bag 13a-13x or 23a-23x. Valve 43 controls the flow of air from the pressure tank 31 to the air compartment 15. Vacuum pump 33 removes air from the air compartment 15 via conduit 40 and, according to the preferred embodiment of the present invention, provides the air, via conduit 38, to reclaim tank 32. Valve 44 controls the removal of air from the air compartment 15 by the vacuum pump 33.

Air from the reclaim tank 32 is provided to air compressor 30 via conduit 37, so as to reduce the power required to effect compression of air by the air compressor 30, which then is provided to pressure tank 31. As those skilled in the art will appreciate, air contained within the reclaim tank 32 will tend to have a pressure greater than the pressure of ambient air, such that the work required to compress the air from reclaim tank 32 is less than that required to compress ambient air.

Air contained within the reclaim tank 32 is at higher than ambient pressure because the air contained within the air compartment 15, from which the air in the reclaim tank came, is at higher than ambient pressure and also because vacuum pump 33 tends to pressurize the air removed from air compartment 15.

The vacuum pump 33 comprises any device which is suitable for removing air from the air compartment 15. Vacuum pump 33 may comprise a blower or a piston-type air pump, for example.

Water pump 35 pumps water from a source thereof, e.g., the body of water within which the artificial reef is contained, via water inlet conduit 29, through conduit 41 to water compartment 16. Valve 45 controls the flow of water from the water pump 35 to the water compartment 16 via inlet port 18. Water is removed from the water compartment 16 via water outlet port 19 which is in fluid communication with water outlet conduit 42. Valve 46 controls the outflow of water from the water compartment 16.

Preferably, the water compartment 16 is formed of a resilient material so as to define a balloon-like structure or bladder, such that when valve 46 is open, water tends to flow out of the water compartment 16 through the water outlet conduit 42 due to elastomeric contraction of the water compartment 16. Alternatively, a water outlet pump may be utilized to remove water from the water compartment 16 by operating the water pump 35 in the reverse direction. As a further alternative, water pump 35 may be further configured so as to pump air into the water compartment 16, so as to force the water contained therein out through outlet conduit 42.

With particular reference to FIG. 5, it can readily be seen that some of the bags, e.g., bag 23u, are generally rectangular in configuration, while other bags, e.g., bags 23v and 23w, are generally wedge-shaped in configuration.

Fasteners 48, which comprise ties, buckles, hook and loop fasteners and/or any other desired fasteners, attach adjacent bags 23a-23x to one another so as to define an artificial reef having the desired shape.

Figure 6:
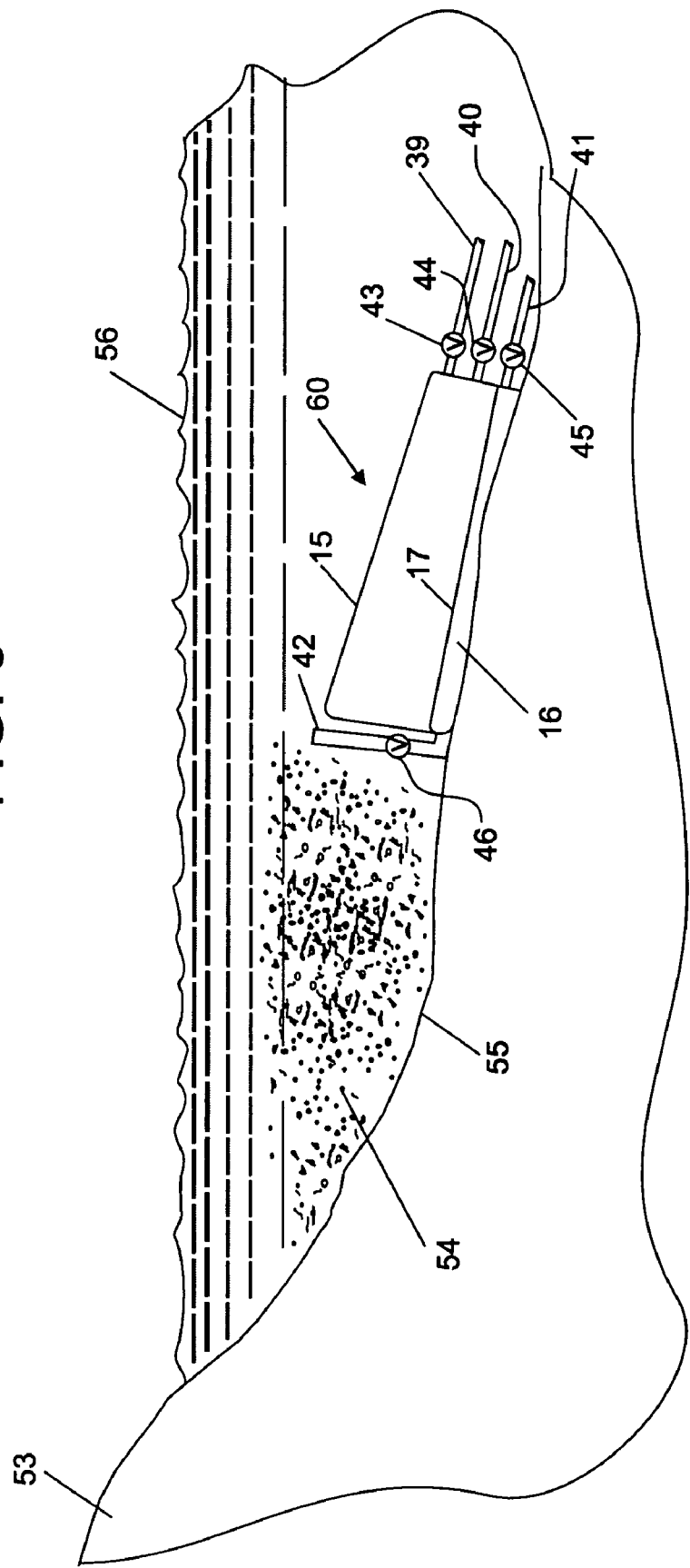
FIG. 6 is a side view of an artificial reef deployed at a beach so as to effect mitigation of beach erosion.

Referring now to FIG. 6, use of the artificial reef 60 of the present invention to mitigate beach erosion is shown. The artificial reef 60 is placed within water 56 at a beach 53 and is oriented such that the original sand 55 tends to remain in place and such that new sand 54 tends to be deposited upon the original sand 55 due to wave action. In this manner, erosion of the original sand 55 from the beach is mitigated.

It is important to note that the artificial reef 60, when used to mitigate beach erosion, may have any desired shape or configuration. That is, the artificial reef 60 need not be generally V-shaped as shown in FIG. 1 or generally Y-shaped as shown in FIG. 3. Rather, the artificial reef 60 may, for example, have a generally straight configuration. Alternatively, the artificial reef 70 may have a curved or serpentine configuration, wherein the artificial reef tends to generally conform to the contour of the nearby shoreline.

It is further contemplated that a plurality of generally parallel artificial reefs may be utilized, such that they act in tandem, so as to reinforce the desired erosion mitigation function of one another. Thus, such an artificial reef system may comprise two or more separate generally parallel artificial reefs.

Figure 7:
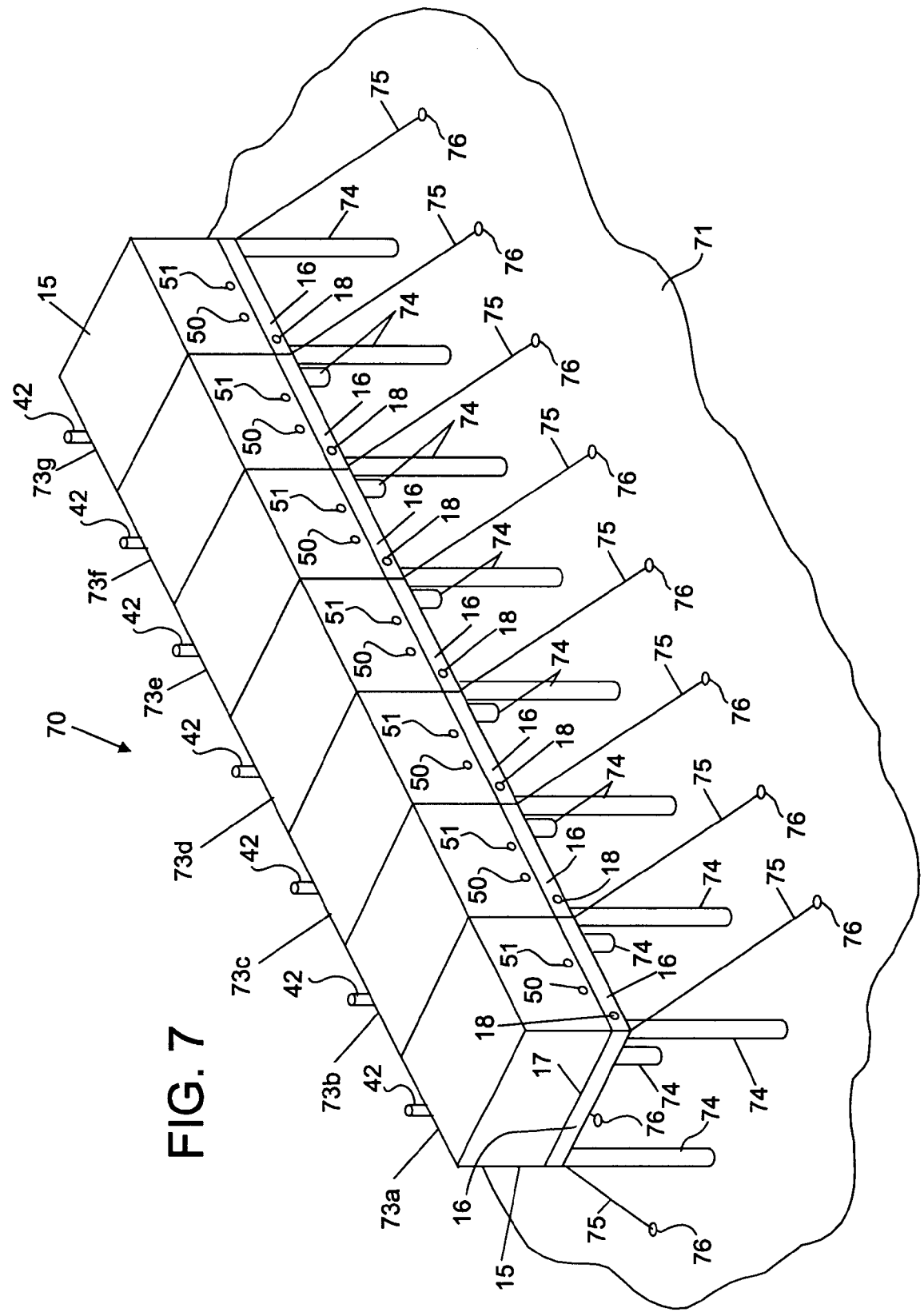
FIG. 7 is a perspective view of a plurality of bags attached to one another so as to define an artificial reef, wherein stand-offs are used to maintain the artificial reef a desired distance above the floor of a body of water and wherein tethers are used to hold the artificial reef in place.

Referring now to FIG. 7, the use of optional stand-offs 74 and tethers 75 is shown. Rigid stand-offs 74 may be utilized so as to maintain the position of the artificial reef 70 at a desired distance above the floor 71, e.g., ocean floor, of the body of water within which the artificial reef 70 is contained. Each stand-off 74 attaches to the artificial reef 70 and prevents the artificial reef 70 from moving toward the floor 71 of the body of water.

Tethers 75 are attached to the artificial reef 70 and to anchor posts 76 or the like. Anchor posts 76 may comprise posts driven into the floor 71 at the bottom of the body of water or may comprise any other suitable structure to which the tether 75 may be attached.

Figure 8:
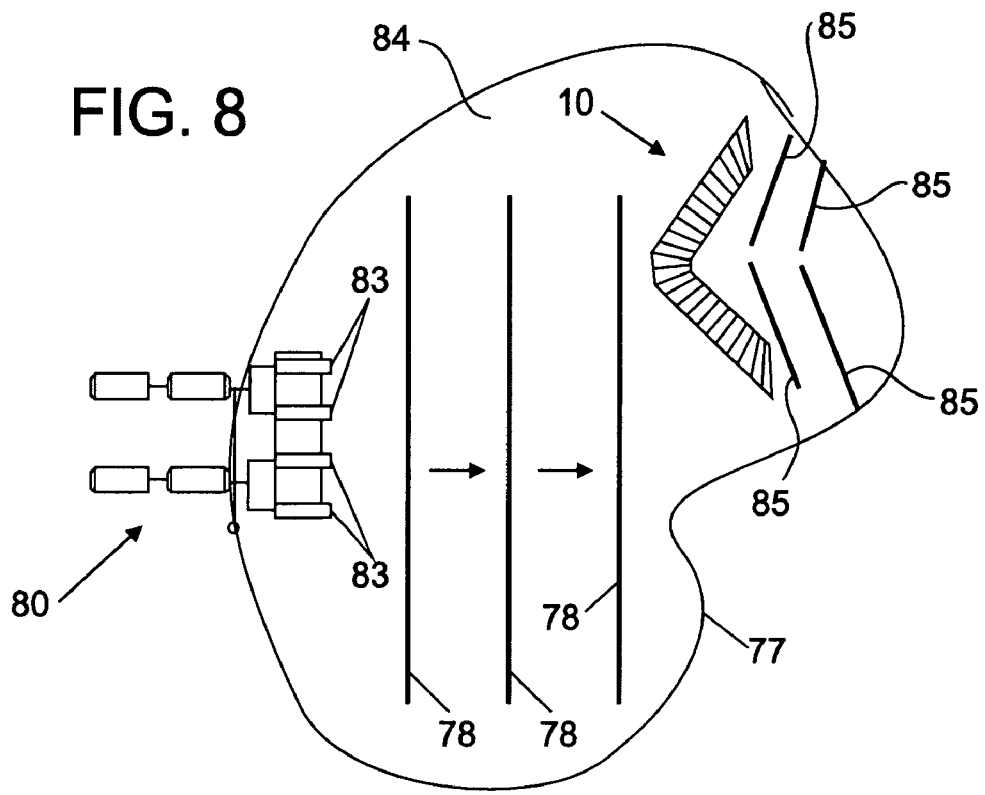
FIG. 8 is a top view of a body of water having a wave making machine and an artificial reef disposed therein according to the present invention and having a liner for mitigating water leakage from the body of water.

Referring now to FIG. 8, a wave generating system comprises a wave generator 80 having at least one chamber 83 from which water may be expelled, such as via the use of compressed air, so as to form waves 78.

One example of a suitable wave generator is disclosed in U.S. Pat. No. 5,833,393, issued to Carnahan et al. on Nov. 10, 1998 and entitled WAVE CANNON, the entire contents of which are hereby expressly incorporated by reference.

A liner 77 may be placed in laminar juxtaposition to the bottom of the body of water 84 so as to mitigate undesirable water leakage therefrom. The artificial reef 10 is positioned in the body of water 84 so as to facilitate the formation of waves 85 which are suitable for surfing and other recreational activities.

Figure 9:
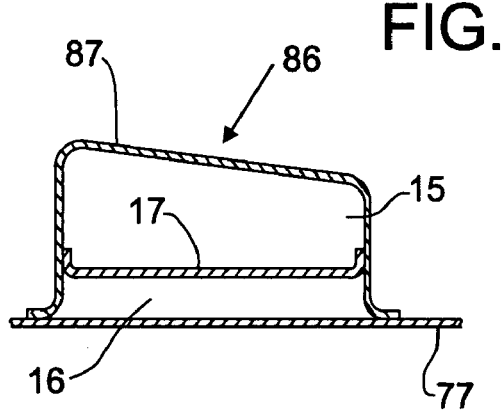
FIG. 9 is a cross-sectional side view of the liner of FIG. 8 showing the artificial reef being formed as an integral structure with the liner thereof.

Referring now to FIG. 9, the liner 77 preferably comprises a durable sheet polymer material, such as 10 mil pit and pond liner provided by Nan Ya Plastics Corporation, America of Livingston, N.J. However, those skilled in the art will appreciate that various other materials are likewise suitable. Optionally, the artificial reef 10 comprises one or more bags 86 formed upon and integrally with the liner 77. Such bag(s) 86 may be formed by attaching, such as via sewing, adhesive bonding, sonic welding, etc., flexible sheet material 87 to the liner 77 so as to define the desired shape. Preferably, the flexible sheet material 87 comprises the same type of material as the liner 77. Optionally, partition 17 may be formed within the bag 86 so as to separate the bag 86 into an air compartment 15 and a ballast compartment 16.

Figure 10:
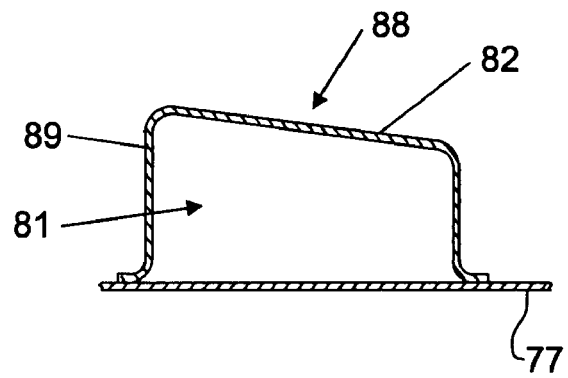
FIG. 10 is a cross-sectional side view of the liner of FIG. 8 showing a pocket formed to the liner and configured so as to receive the artificial reef.

Referring now to FIG. 10, a pocket or pouch 88 may be defined by similarly attaching a durable sheet material to the liner 77 so as to define a cover 82. The cover 82 preferably comprises the same type of material as the liner 77. The cover 82 has an opening 89 formed therein such that a chamber 81 is defined within which a bag (such as 13a-13x or 23a-23x) may be placed. Thus, one or more such pouches may be utilized to contain one or more bags which define an artificial reef. Weights such as stones, soil, concrete or other anchoring means such as eye bolts or tethers may be utilized to anchor an artificial reef formed integrally with the liner 77, as shown in FIG. 9, or an artificial reef defined by bags disposed within pockets of the liner 77, as desired.

Like the liner 77, the cover 82 preferably comprises a durable and flexible polymer sheet material such as 10 mil pit and pond liner such as that provided by Nan Ya Plastics Corporation, America of Livingston, N.J. Those skilled in the art will appreciate that various other materials are likewise suitable.

Figure 19:
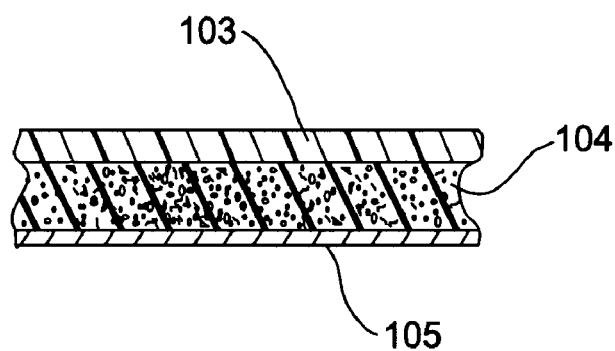
FIG. 19 is an enlarged cross-sectional view of a portion of the bag wall of FIG. 17.

Further, the cover 82 may optionally comprise additional cushioning material, such as that shown in FIG. 19, so as to mitigate the likelihood of injury when inadvertently contacted.

The bags, e.g., 13a-13x or 23a-23x, of any embodiment of the present invention may alternatively be filled with a resilient foam material, rather than merely filled with air. Preferably, a closed cell flexible polymer material, such as closed cell flexible urethane foam is utilized.

Thus, according to one preferred embodiment of the present invention, a cover is provided which holds one or more bags in place or which helps to hold one or more bags in place, which provides protection against damage to the bags, e.g., punctures and/or abrasions, and which may, if desired, be configured to provide enhanced cushioning so as to reduce the likelihood of injury when inadvertently contacted, such as during recreational activities.

Referring now to FIGS. 11-20, another preferred embodiment of the present invention comprises an artificial reef assembly 100. The artificial reef assembly 100 is comprised of a base 101, a retainer bracket 102 and a plurality of individual air containing bags 106a-106d. Alternatively, the bags 106a-106d may be formed as a single, integral unit. However, formation of the bags 106a-106d as separate, individual units facilitates easier handling thereof, particularly during assembly of the artificial reef assembly 100.

It is important to appreciate that the embodiment of the artificial reef illustrated in FIGS. 11-20, as well as any other embodiment thereof, may be sized as desired, so as to accomplish a desired function. More particularly, the length, width and height of the artificial reef may be varied, as desired.

Further, the number, size, shape and configuration of air containing bags 106a-106d may similarly be varied, as desired. Indeed, an artificial reef may comprise any desired number of air containing bags 106a-106d and each air containing bag may have any desired shape or configuration. The shape or configuration of each individual air containing bag 106a-106d need not be the same as or even similar to other air containing bags 106a-106d of the same artificial reef.

Figure 18:
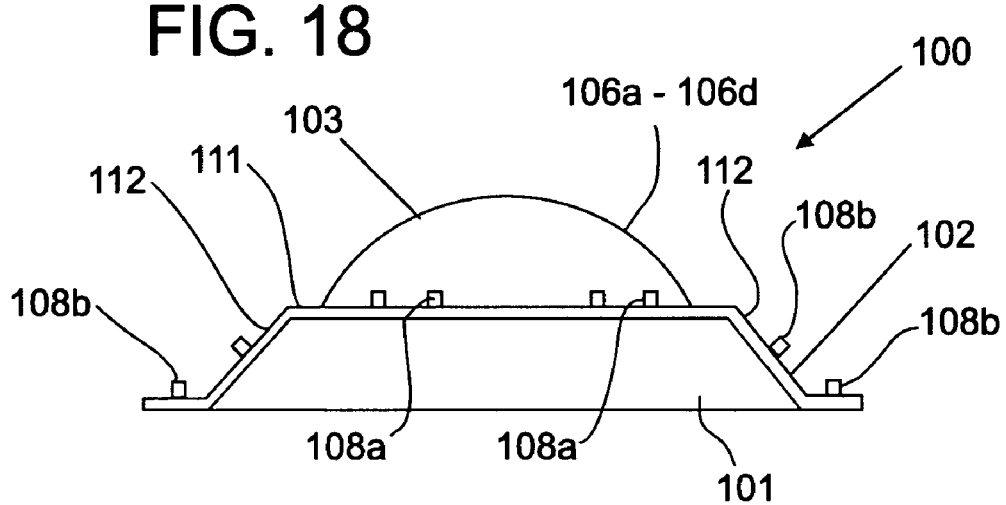
FIG. 18 is an enlarged side view of the artificial reef assembly of FIG. 11.

With particular reference to FIG. 12, it will be appreciated that assembly of the artificial reef assembly 100 of the present invention comprises disposing each of the bags 106a-106d at least partially within a recess 107a-107d formed in the base 101 and then attaching the retainer bracket 102 to the base 101, preferably utilizing fasteners such as bolts 108a (FIG. 18). Optionally, bolts 108b may be utilized to anchor the artificial reef assembly 100 to a concrete floor or foundation of an artificially formed body of water or, by utilizing suitable anchor bolts to soil, bedrock or another naturally occurring substrate.

Figure 20:
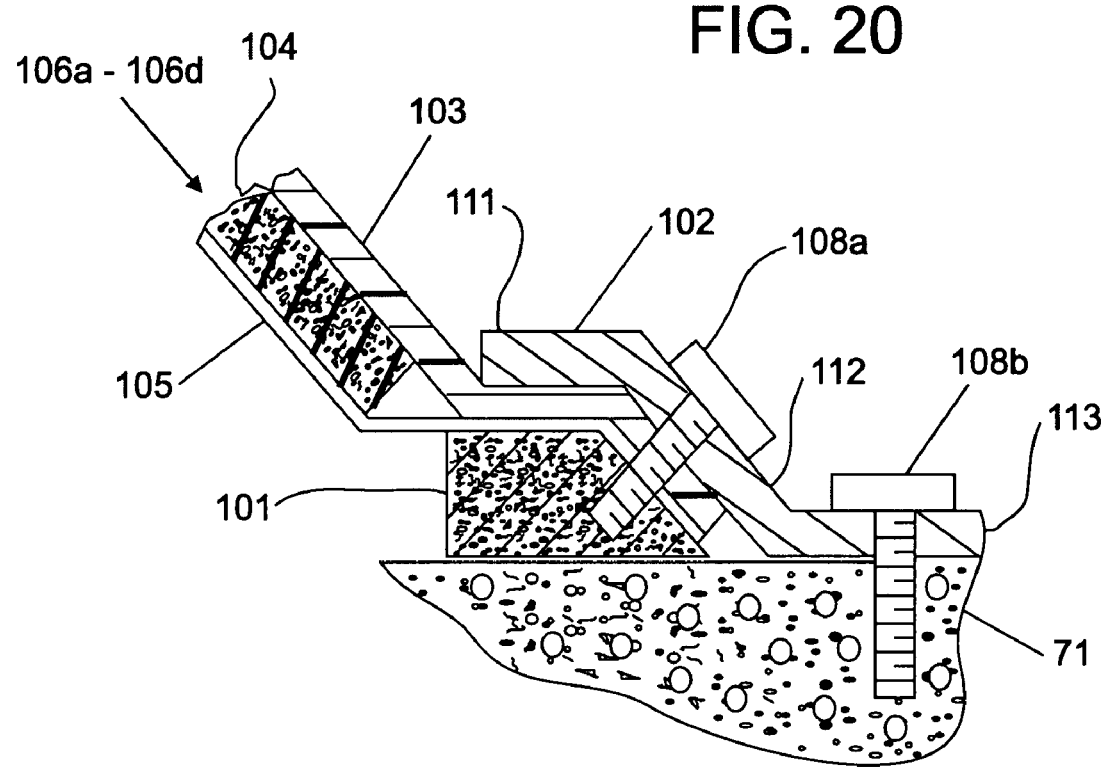
FIG. 20 is an enlarged cross-sectional side view of a portion of the artificial reef assembly of FIG. 11, showing attachment of the retainer bracket to the base such that the bag flange is captured therebetween and showing attachment of the retainer bracket to a substrate such as the concrete floor of a swimming pool.

With particular reference to FIG. 13, the retainer bracket 102 is preferably formed of stainless steel, so as to inhibit undesirable degradation thereof, such as frequently occurs due to immersion in salt water. Alternatively, the retainer bracket 102 may comprise a polymer or composite material. Bolt throughholes 109a receive bolts 108a which pass therethrough so as to attach the retainer bracket 102 to the base 101. Similarly, bolt throughholes 109b receive bolts 108b which pass therethrough so as to attach the retainer bracket 102 to a desired substrate or foundation 71 (FIG. 20). Openings 110 in the retainer bracket 102 are sized and configured so as to accommodate the bags 106a-106d which extend upwardly from the base 101 therethrough. Thus, the number of openings 110 correspond to the number of bags 106a-106d desired.

According to the preferred embodiment of the present invention, the retainer bracket 102, as viewed from the end, has a gull-wing configuration wherein an upper surface 111 has two diagonal surfaces 112 descending therefrom and diagonal surfaces 112 have horizontal flanges 113 extending horizontally and outwardly therefrom. The openings 110 and a portion of the bolt throughholes 109a are formed in the upper surface. Additional bolt throughholes 109a are formed in the diagonal surfaces 112. Bolt throughholes 109b for attaching the artificial reef assembly 100 to a substrate are formed in the horizontal flanges 113.

With particular reference to FIGS. 14 and 15, the base 101 preferably comprises concrete or the like. Alternatively, the base comprises metal, epoxy, a composite, a polymer material or any other suitable material. Threaded bolt holes 114a and 114b facilitate the attachment of the retainer bracket 102 to the base 101 via fasteners, such as bolts 108a. Recesses 107a-107d are configured to receive the lower portion of bags 106a-106d. Threaded bolt holes 114a are formed in the uppermost surface 116 of the base 101 and threaded bolt holes 114b are formed in the side surfaces 117 of the base 101.

The recesses 107a-107d are preferably configured so as to correspond generally in number and shape to the cut-outs 110 of the retainer bracket 102.

Figure 16:
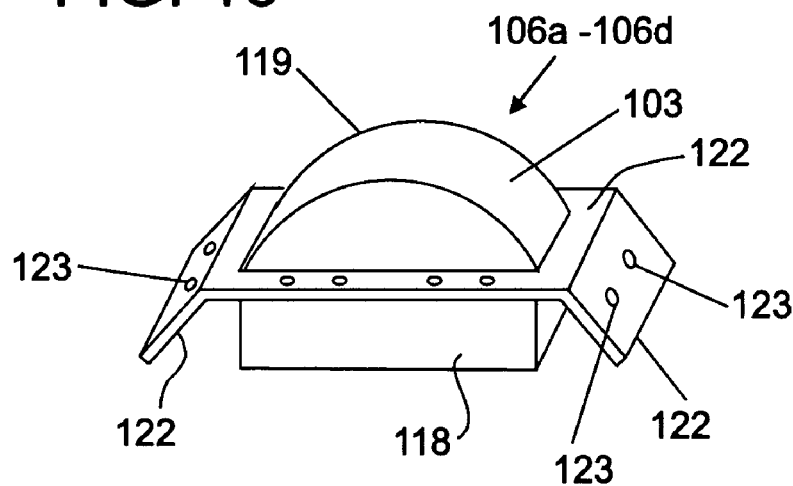
FIG. 16 is an enlarged perspective view of an exemplary one of the bags of FIG. 12.
Figure 17:
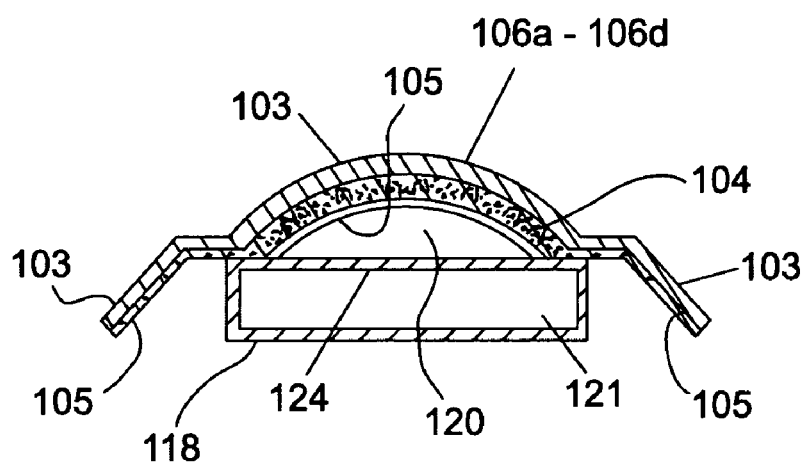
FIG. 17 is an cross-sectional side view of the bag of FIG. 16.

With particular reference to FIGS. 16 and 17, each bag 106a-106d preferably comprises an upper portion 119 and a lower portion 118. The upper portion 119 defines an air compartment 120 and the lower portion 118 defines a ballast compartment 121.

The lower portion 118 of each bag 106a-106d is preferably configured so as to generally conform in shape to the cavities 107a-107d formed in the base 101. However, it is important to note that each of the cavities 107a-107d need not be identical to one another, but may alternatively be sized and configured as desired.

A peripheral flange 122 preferably surrounds a substantial portion of each bag 106a-106d, preferably proximate the interface of the upper portion 119 and the lower portion 118. The peripheral flange 122 comprises bolt throughholes 123 through which fasteners, such as bolts 108a, pass so as to attach the retainer bracket 102 to the base 101.

The upper portion 119 of each bag is preferably generally dome-shaped. However, those skilled in the art will appreciate that various other shapes of the upper portion 119 of each bag 106a-106d may be desired. Indeed, each separate bag 106a-106d may comprise an upper portion 119 having a shape which is different from the shape of one or more of the other bags 106a-106d.

With particular reference to FIGS. 17 and 19, the upper portion 119 of each bag 106a-106d preferably comprises a durable outer liner 103, an airtight inner liner 105 and a resilient foam material 104 disposed intermediate the outer liner 103 and inner liner 105.

The durable outer liner 103 provides resistance to abrasion and puncture, so as to mitigate the likelihood of inadvertent deflation of each bag 106a-106d. The foam material 104 provides a cushioned or resilient surface, so as to mitigate the likelihood of injury due to inadvertent contact within air bag 106a-106d, such as may occur during recreational activities. The inner liner 105 is airtight so as to mitigate air leakage from each bag 106a-106d.

According to the preferred embodiment of the present invention, the outer liner 103 comprises a material such as 10 mil pit and pond liner provided by Nan Ya Plastics Corporation, America of Livingston, N.J. However, those skilled in the art will appreciate that various other materials are likewise suitable. Indeed, the thickness and type of material selected for the outer liner 103 may be chosen based upon the expected environmental conditions. For example, if comparatively greater abrasion is expected due to harsh environmental conditions and/or recreational activities, then an outer liner 103 having a thickness of between 20 and 40 mils or greater may alternatively be selected.

The inner liner 105 may be comprised of a comparatively thin material, e.g., 5-10 mils, since the inner liner 105 is not expected to be subject to abrasion or puncture.

The foam material 104 may comprise any suitable, flexible foam material, preferably having a predominantly closed-cell configuration so as to enhance leak resistance and mitigate water logging thereof. For example, a closed cell flexible urethane foam may be utilized.

The air compartment 120 is preferably separated from the ballast compartment 121 via a common wall 124.

The air compartment 120 and the ballast compartment 121 may optionally be individually fillable with air and water, respectively, via a remote control system, as described above. Alternatively, the ballast compartment 121 may be filled with ballast such as soil, sand, rocks, gravel, concrete, etc. As a further alternative, the air compartment 120 may be filled with air at the time of installation and replenished, as necessary via an air valve, similar to the manner in which a car tire is filled with air.

Thus, the present invention provides an artificial reef which may be configured so as to enhance the suitability of waves for surfing and other recreational activities, which provides a resilient or cushioned surface so as to mitigate injury when inadvertently contacted during such recreational activities and which may be configured so as to mitigate beach erosion.

It is understood that the exemplary embodiments of the artificial reef described herein and shown in the drawings represent only presently preferred embodiments of the invention. Indeed, various modifications and additions may be made to such embodiments without departing from the spirit and scope of the invention. For example, various different cross-sectional configurations of the artificial reef are contemplated. Thus, the artificial reef may have a generally circular, oval, elliptical, elongate, octagonal, hexagonal, pentagonal, or any other desired cross-section. Further, the artificial reef of the present invention may be formed from any suitable resilient material.

Various methods for forming the bags of the artificial reef of the present invention are contemplated. For example, the bags may be formed by heat sealing, ultrasonic welding or adhesive bonding sheets of resilient material to one another. Alternatively, various molding techniques such as rotary molding or blow molding may be utilized to form the bags.

Thus, these and other modifications and additions may be obvious to those skilled in the art and may be implemented to adapt the present invention for use in a variety of different applications.

What is claimed is:

1. An artificial reef positionable within a body of water wherein water flows over the artificial reef to create at least one surfable wave on the opposite side of the artificial reef from the direction of the water flow, the artificial reef comprising:
   a plurality of independent deformable bags constructed from a flexible material and attached to one another so as to form a desired shape wherein at least one bag is partially wedge shaped with respect to both height and width to facilitate forming the desired shape, and the plurality of deformable bags are at least partially independently inflatable with air to provide control over the height of the reef such that water flowing over the artificial reef creates at least one enhanced surfable wave on the opposite side of the artificial reef from the direction of the water flow.

2. The artificial reef as recited in claim 1, wherein the plurality of deformable bags further comprise:
   an air compartment for containing air; and
   a ballast compartment for containing ballast.

3. The artificial reef as recited in claim 2, wherein the air compartment is larger than the ballast compartment.

4. The artificial reef as recited in claim 3, wherein the plurality of deformable bags further comprise a common wall separating the air compartment from the ballast compartment.

5. The artificial reef as recited in claim 2, wherein the air compartment includes an air inlet/outlet port for facilitating inflation and deflation of the deformable bag.

6. The artificial reef as recited in claim 2, wherein the ballast compartment includes an opening for facilitating addition of ballast to the ballast compartment and removal of ballast from the ballast compartment.

7. The artificial reef as recited in claim 2, wherein the ballast compartment is configured to contain water.

8. The artificial reef as recited in claim 1 further comprising an anchor attachable to at least one deformable bag for maintaining the artificial reef at a desired location within the body of water.

9. The artificial reef as recited in claim 1 wherein the plurality of deformable bags are defined by pouches formed in a liner, the liner mitigating water leakage from a body of water.

10. The artificial reef as recited in claim 1 further comprising eyelets formed to each of the plurality of deformable bags for facilitating attachment of the deformable bags to one another.

11. The artificial reef as recited in claim 1 further comprising hook and loop fasteners attached to the plurality of deformable bags to facilitate attachment of the deformable bags to one another.

12. The artificial reef as recited in claim 1 further comprising buckles formed to the plurality of deformable bags to facilitate attachment of the deformable bags to one another.

13. The artificial reef as recited in claim 1 further comprising clips formed to the plurality of deformable bags to facilitate attachment of the deformable bags to one another.

14. The artificial reef as recited in claim 1 wherein the flexible material is vinyl.

15. The artificial reef as recited in claim 1 wherein the flexible material is vinyl having a thickness of approximately 0.040 inch.

16. The artificial reef as recited in claim 1 wherein the plurality of deformable bags are attached to one another and form a V shape.

17. The artificial reef as recited in claim 16 wherein the foam comprises a flexible foam.

18. The artificial reef as recited in claim 16 wherein the foam comprises an open cell flexible foam.

19. The artificial reef as recited in claim 16 wherein the foam comprises a flexible, closed cell, polymer foam.

20. The artificial reef as recited in claim 1 wherein the plurality of deformable bags are attached to one another and form a Y shape.

21. An artificial reef positionable within a body of water wherein water flows over the artificial reef to create at least one surfable wave on the opposite side of the artificial reef from the direction of the water flow, the artificial reef comprising:

a plurality of deformable bags constructed from a flexible material and attached to one another so as to form a desired shape wherein at least one bag is partially wedge shaped with respect to both height and width to facilitate forming the desired shape, and the plurality of deformable bags are at least partially filled with foam to provide control over the height of the reef such that water flowing over the artificial reef creates at least one enhanced surfable wave on the opposite side of the artificial reef from the direction of the water flow.

* * * * *